United States Patent [19]
Kume et al.

[11] Patent Number: 6,090,483
[45] Date of Patent: Jul. 18, 2000

[54] ADHESIVE SHEET FOR PRINTING AND LABEL

[75] Inventors: Katsuya Kume; Hidetoshi Itou; Katsuyuki Okazaki; Mitsuo Kuramoto, all of Osaka, Japan

[73] Assignee: Nitto Denko Corporation, Osaka, Japan

[21] Appl. No.: 09/008,062

[22] Filed: Jan. 16, 1998

[30] Foreign Application Priority Data

Jan. 17, 1997 [JP] Japan ................................. 9-019784
Sep. 11, 1997 [JP] Japan ................................. 9-268140

[51] Int. Cl.⁷ ............................................ C09J 7/02
[52] U.S. Cl. .................... 428/354; 428/355 CN; 428/355 N; 428/906; 428/914
[58] Field of Search .................. 428/352, 354, 428/355 CN, 355 N, 906, 914

[56] References Cited

U.S. PATENT DOCUMENTS 5,480,700  1/1996  Kume et al. ............................. 428/195
5,578,365  11/1996  Kume et al. ............................. 428/195

FOREIGN PATENT DOCUMENTS

| 0 397 379 | 11/1990 | European Pat. Off. | B32B 27/32 |
| 92/07347 | 4/1992 | WIPO | G09F 3/04 |
| 93/09195 | 5/1993 | WIPO | C09J 7/02 |
| 96/21557 | 7/1996 | WIPO | B32B 3/00 |

*Primary Examiner*—Blaine Copenheaver
*Attorney, Agent, or Firm*—Sughrue, Mion, Zinn, Macpeak & Seas, PLLC

[57] ABSTRACT

Disclosed are (1) an adhesive sheet for printing comprising a layer to be printed having no release coat, and at least an adhesive layer having an adhesive strength of 1 to 5000 gf/50 mm to the layer to be printed, and (2) a label having a heat transfer pattern comprising a heat fixing ink comprising a polyolefin and a colorant on the layer to be printed of the adhesive sheet for printing.

12 Claims, 1 Drawing Sheet

ADHESIVE SHEET FOR PRINTING AND LABEL

FIELD OF THE INVENTION

The present invention relates to a sheet for printing which is wound to form a wound product without a separator covering an adhesive layer and to which a heat transfer pattern can be imparted in the field according to circumstances to publish a label.

BACKGROUND OF THE INVENTION

Conventionally, printing sheets for heat transfer have been known each of which comprises a film substrate, an adhesive layer provided on one surface thereof and a separator covering the adhesive layer and is wound to form a wound product. However, such sheets have the problems that the separators become unnecessary articles such as wastes when heat transfer patterns are imparted to the printing sheets to put the sheets into practical use as labels, and that the separators are flexible and difficult to be released because they are formed of thin films.

In the above, if the printing sheets have no separators covering the adhesive layers, it becomes difficult to rewind the wound products, and the sheets adhere to a progressive mechanism in a heat transfer printer, which results in the difficulty of practical use as the printing sheets. When release coats are provided on surfaces of the film substrate in accordance with the adhesive sheets having no separators, the fixing of ink on the film substrates becomes difficult, resulting in the failure of practical use as the printing sheets.

SUMMARY OF THE INVENTION

It is therefore an object of the present invention to provide an adhesive sheet for printing which can be wound to form a wound product without a separator covering an adhesive layer, the wound product being mounted in a heat transfer printer, a label formed by successively imparting a heat transfer pattern being easily taken out while rewinding it like a sheet having no adhesive layer, and the label published according to circumstances being easily fixedly adhered to an adherend by means of the adhesive layer.

The present invention provides an adhesive sheet for printing comprising a layer to be printed having no release coat in which at least a surface portion is formed of an olefin layer, and at least an adhesive layer adhering to the layer to be printed, and having an adhesive strength of 1 gf/50 mm to 5000 gf/50 mm, when the sheet in which the layer to be printed is adhered to the adhesive layer is wound to form a wound product and rewound at a speed of 5 m/minute. The present invention also provides a label having a heat transfer pattern comprising heat fixing ink comprising a polyolefin and a colorant on the layer to be printed of the adhesive sheet for printing.

DETAILED DESCRIPTION OF THE INVENTION

Figure 1:
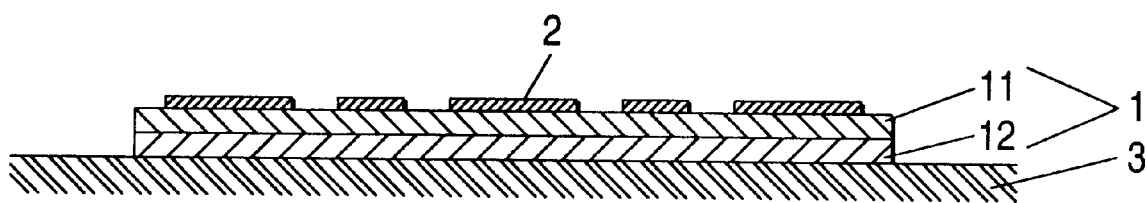
FIG. 1 is a cross sectional view showing one embodiment of a label of the present invention.
Figure 2:
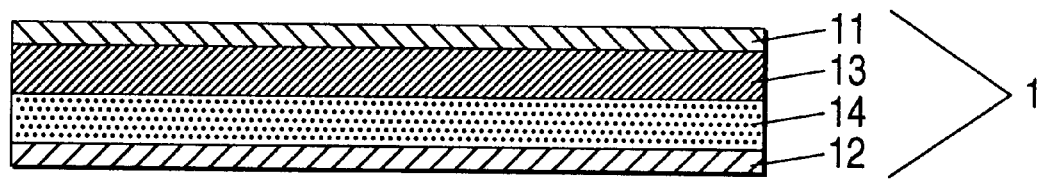
FIG. 2 is a cross sectional view showing another embodiment of an adhesive layer for printing of the present invention.

An adhesive sheet for printing of the present invention comprises a layer to be printed having no release coat in which at least a surface portion is formed of an olefin layer, and at least an adhesive layer adhering to the layer to be printed, and has an adhesive strength of 1 to 5,000 g/50 mm, when the sheet in which the layer to be printed is adhered to the adhesive layer is wound to form a wound product, and rewound at a speed of 5 m/minute. Embodiments thereof are shown in FIGS. 1 and 2. The numeral 11 designates a layer to be printed, the numeral 12 designates an adhesive layer, the numeral 13 designates a reinforcing substrate provided as required, and the numeral 14 designates a viscoelastic material layer provided as required.

FIG. 1 shows an adhesive sheet made into a label. The numeral 2 designates a pattern layer imparted to the layer 11 to be printed of the adhesive sheet 1 for printing. Further, the numeral 3 designates an adherend, and the label is fixedly adhered by means of the adhesive layer 12 of the adhesive sheet 1 for printing.

The adhesive sheet for printing is only required to be a sheet-like material in which the layer to be printed at least a surface portion of which is formed of a polyolefin layer and the adhesive layer are exposed on the surfaces thereof, respectively. It can be therefore formed in an appropriate shape. Examples thereof include a two layer structure consisting of the layer 11 to be printed and the adhesive layer 12 as shown in FIG. 1, and a structure having the reinforcing substrate 13 and/or the viscoelastic material layer 14 between the layer to be printed and the adhesive layer as shown in FIG. 2.

At least the surface portion of the layer to be printed is formed of the polyolefin layer for fixing ink and for that high adhesive strength is not developed when adhering to the adhesive layer without a release coat, resulting in easy releasing. There is no particular limitation on the kind of polyolefin, and generally, polyethylene, polypropylene, ethylene-propylene copolymers and 4-methylpentene are used. From the standpoints of solvent resistance, thermal fusibility and the fixing property of heat fixing ink, polyolefins having a viscosity average molecular weight of 500 to 6,000,000, preferably 4,000,000 or less, and more preferably 1,500,000 or less, are preferably used.

From the standpoint of rewind of the adhesive sheets for printing wound and stored at high temperatures, namely inhibition of an increase in adhesive strength, polyolefins having a density of 0.94 $g/cm^3$ or less are preferably used. Low density polyethylene is preferred among others, and 4-methylpentene is particularly preferred.

The layers to be printed can be formed by making the polyolefins into film form by an appropriate method such as a coating method or a forming method. From the standpoint of easy rewind of the adhesive sheets for printing wound and stored at high temperatures, the layers to be printed having a mean square roughness of 0.4 $\mu$m or less, preferably 0.2 $\mu$m or less, and more preferably 0.15 $\mu$m or less, at surfaces thereof are preferred.

In the production of the layers to be printed, one or more kinds of polyolefins may only be used, and appropriate additives such as reinforcing materials such as fibers, colorants such as white pigments, antioxidants and releasing polymers can also be added. The additives are generally added in an amount of 30% by weight or less from the standpoints of the printing property and solvent resistance. A countermeasure corresponding to the necessity for an improvement in a contrast to a pattern imparted may utilize a color of a reinforcing substrate used.

The above-mentioned antioxidants are added for an improvement in heat resistance. The amount thereof added is preferably from 0.01 to 10 parts by weight, more preferably from 0.1 to 5 parts by weight, and most preferably from 0.2 to 2 parts by weight, per 100 parts by weight of polyolefin. As the antioxidants, appropriate compounds such as compounds known to be used in polyolefins, for example, aromatic amines, phenols, sulfur compounds, phosphorus compounds, hydrazine compounds and oxamide compounds, can be used.

The addition of the releasing polymers makes it possible to decrease the adhesive strength of the adhesive layers to the layers to be printed, and to easily rewind the wound products when the sheets in which the adhesive layers are adhered to the layers to be printed on the back thereof are wound to form the wound products, as well, and an object thereof is to improve the automatic progressiveness of the adhesive sheets for printing through a printing device.

As the releasing polymers, appropriate polymers such as polymers for release coats known to be used in the adhesive sheets, for example, silicone, long-chain alkyl and fluorine polymers, may be used, and the silicone polymers are preferably used among others. From the standpoints of a reduction in adhesive strength and prevention of a reduction in the fixing property of ink, the amount of the releasing polymers added is preferably from 0.01 to 10 parts by weight, more preferably from 0.1 to 8 parts by weight, and most preferably from 1 to 5 parts by weight, per 100 parts by weight of polyolefin.

The thickness of the layers to be printed may be appropriately determined depending on the purpose of use and the form of the adhesive sheets for printing. In general, from the standpoints of the fixing property of ink and strength, the thickness is from 0.1 to 500 $\mu$m, preferably from 0.5 to 100 $\mu$m, and more preferably from 1 to 50 $\mu$m. When the reinforcing substrates are used in combination, the thickness of the layers to be printed is preferably 0.1 $\mu$m or more, more preferably 0.5 $\mu$m or more, and most preferably 1 $\mu$m or more, from the standpoints of the fixing property of ink and strength.

When polyethylene is used in the formation of the layers to be printed, the electron beam irradiation treatment is effective for an improvement in heat resistance. The dose thereof is preferably from 1 to 20 Mrads, and more preferably from 5 to 15 Mrads, from the standpoints of an improvement in heat resistance due to an increase in crosslink density and prevention of a reduction in heat resistance caused by irradiation deterioration.

For allowing the adhesive sheet to simply adhere to an adherend when the adhesive sheet is used as the label, the adhesive layer is provided on the back of the substrate for printing. In the present invention, for attaining easy rewind of the wound product by means of a general-purpose heat transfer printer when the sheet in which the adhesive layer having no cover with a separator is adhered to the releasing layer to be printed on the back thereof is wound to form the wound product, followed by placing it in an atmosphere of high temperature, the wound product is required to have an adhesive strength of 1 to 5,000 gf/50 mm, when the sheet is rewound at a speed of 5 m/minute after standing as described above. However, the adhesive layer having a rewind adhesive strength of 4,000 gf/50 mm or less is preferably selected.

From the standpoints of smooth rewind property by the heat transfer printer, the clear printing property and harmony of the adhesive strength to the adherend, the rewind adhesive strength is preferably 5 to 4,000 gf/50 mm, more preferably 10 mm to 1,500 gf/50 mm, and most preferably 1 to 800 gf/50 mm.

In the formation of the adhesive layers, appropriate adhesive materials satisfying the above-mentioned adhesive strength can be used. In particular, from the standpoint of maintenance of the initial adhesive strength, accordingly the stability of rewind at the time when the sheets are wound to form the wound products, acrylic or rubber adhesives can also be used. However, the adhesive layers are preferably formed by use of one or more kinds of urethane adhesives, polyester adhesives and polyamide adhesives. These adhesives are also preferably used from the standpoints of low adhesive strength to the layers to be printed and harmony of the fixing strength to the adherends.

The adhesive layers can be formed by appropriate methods, for example, rolling methods such as the calender roll method, methods comprising forming the adhesive layers on separators by appropriate methods such as coating methods such as the doctor blade method and the gravure roll coater method, and transferring and fixing them onto specified surfaces such as the layers to be printed, and methods of coating on specified surfaces.

The thickness of the adhesive layers is preferably 0.01 to 500 $\mu$m, from the standpoints of achievement of the adhesive strength to the above-mentioned layers to be printed and suitability as the sheets for printing when the sheets are mounted in a commercial printer. When the stable forming property of the adhesive layers uniform in thickness is taken into consideration, the thickness of the adhesive layers is preferably 0.5 to 100 $\mu$m, more preferably 1 to 50 $\mu$m, and most preferably 2 to 20 $\mu$m.

As described above, the adhesive sheet for printing is only required to be in a state in which the layer to be printed at least a surface portion of which is formed of a polyolefin layer is exposed on one surface thereof and the adhesive layer is exposed on the other surface. Accordingly, appropriate layers such as the reinforcing substrate 13 and the viscoelastic material layer 14 may be allowed to intervene between the layer to be printed and the adhesive layer, as shown in FIG. 2.

The above-mentioned reinforcing substrate is used for supporting and reinforcing the layer to be printed or the adhesive layer according to the purpose of use as required. As the reinforcing substrates, therefore, appropriate materials such as resin coated layers and films, fibers, fabrics, paper, nonwoven fabrics, and metal foil, nets and wires can be used. The properties such as heat resistance of the reinforcing substrates may be appropriately determined according to the purpose of use. For example, reinforcing substrates comprising heat-resistant polymers such as polyesters, polyimides, fluorine resins and polyamides can be used. The properties of the adhesive sheets for printing or the labels can be easily controlled by the selection of the reinforcing substrates.

The adhesive sheets for printing having the reinforcing substrates can be formed by appropriate methods, for example, methods of forming the layers to be printed or the adhesive layers on the reinforcing substrates by appropriate methods such as the heat laminate method and the extrusion coating method, methods of impregnating the reinforcing substrates with materials for forming the layers to be printed in solution form or melt form, and methods of allowing the reinforcing substrates to exist in the layers to be printed.

On the other hand, the viscoelastic material layer is provided for improving the fixing strength to the adherend when the adhesive sheet is used as the label, while maintaining low adhesive strength of the adhesive layer to the layer to be printed. The viscoelastic material layers having a complex rigidity of $10^4$ to $10^7$ dynes/cm$^2$ at ordinary temperature at a frequency of 1 Hz are preferably used from the standpoint of prevention of flowing out (protrusion) caused by compression when the adhesive sheets are wound to form the wound products or the effect of improving the fixing strength to the adherends. The viscoelastic material layer is arranged in a position adjacent to the adhesive layer. In the formation of the viscoelastic material layers, appropriate adhesives such as acrylic adhesives, silicone adhesives, vinyl alkyl ether adhesives, polyvinyl alcohol adhesives, polyvinylpyrrolidone adhesives and polyacrylamide adhesives can be used. In particular, adhesives exhibiting high adhesive strength can be preferably used. The thickness of the viscoelastic material layers can be appropriately determined according to fixing strength necessary for the purpose of use of the adhesive sheets for printing. In general, it is 1 to 500 µm, preferably 100 µm or less, and more preferably 20 to 50 µm.

The adhesive sheets for printing according to the present invention can be formed into printed matter such as the labels by application of known printing methods to the layers to be printed thereof, and particularly, can be mounted in a printer such as a heat transfer printer and automatically printed similar to the conventional sheets for printing. The adhesive sheets can also be mounted in the printer in wound form in which the adhesive layers are adhered to the layers to be printed on the back thereof, as well as in sheet form.

In the above, when the printed matter is formed by means of the printer such as the heat transfer printer, an appropriate sheet can be used as an ink sheet to which heat fixing ink is imparted. However, from the standpoint of the fixing property of ink, it is preferred that a heat transfer pattern is formed by use of the ink sheet to which heat fixing ink comprising the polyolefin and the colorant is imparted.

According to the above, the pattern excellent in the fixing property, abrasion resistance and solvent resistance can be formed by melt pressing the polyolefin of the layer to be printed of the adhesive sheet for printing on the polyolefin contained in the heat fixing ink of the ink sheet, and the label of high quality can be formed by imparting the pattern with the commercial heat transfer printer according to circumstances.

It is preferred that the heat fixing ink is comprised of at least the polyolefin and the colorant. As the polyolefins, polyolefins having a viscosity average molecular weight of 100 to 300,000 and preferably 200,000 or less in accordance with the above-mentioned polyolefins for the formation of the layers to be printed are preferably used from the standpoint of thermal fusibility or the transfer pressing property of ink according to the heat transfer printer. In particular, polyolefins having a viscosity average molecular weight of 5,000 or less are preferred in terms of the printing property by low energy of 0.15 mj/dot or less, and polyolefins having a viscosity average molecular weight of more than 5,000 are preferred in terms of solvent resistance given to the patterns.

The colorants may be ones in accordance with the conventional colorants such as organic and inorganic pigments, carbon and metal powders. Typical examples of the colorants include organic colorants such as azo pigments, phthalocyanine pigments, triphenylmethane pigments, metal complex pigments, vat dye pigments, quinacridone pigments, isoindolinone pigments; and inorganic colorants, for example, white colorants such as silica, titania, alumina, zinc white, zirconia, calcium oxide and mica, red colorants such as manganese oxide•alumina, chromium oxide•zinc oxide, iron oxide and cadmium sulfide•selenium sulfide, blue colorants such as cobalt oxide, zirconia•vanadium oxide and chromium oxide•divanadium pentaoxide, black colorants such as chromium oxide•cobalt oxide•iron oxide•manganese oxide, chlomates and permanganates, yellow colorants such as zirconium•silicon•praseodymium and vanadium•tin•chromium•titanium•antimony, green colorants such as chromium oxide, cobalt•chromium and alumina•chromium, and pink colorants such as aluminum•manganese and iron•silicon•zirconium.

In forming the printed matter such as the label, any pattern such as a character pattern, a graphic pattern or a bar cord pattern may be imparted. However, when an identification label is formed, it is preferred that a good contrast or a difference in color tone is made between the adhesive sheet for printing and the ink pattern. As to the printed matter thus obtained, the imparted pattern may be heat treated through heat rolls for fixing it more firmly.

The printed matter formed can be fixed to the adherend through the adhesive layer of the adhesive sheet for printing. In fixing the printed matter, it may be heat treated by means of heat rolls for fixing it more firmly. Accordingly, this heat treatment can also serve as the above-mentioned fixing of the pattern.

The printed matter according to the present invention can be preferably used for various purposes, for example, for giving identification marks such as bar codes, shopping labels or other patterns to various articles such as pottery, glass products, ceramic products, metal products, enameled products, resin products, wood products and paper products. In particular, it can be preferably used on adherends requiring washing processes or wiping processes using solvents. The adherends may be in any form, for example, in tabular form or container form.

The present invention is described below in more detail by reference to the following examples and comparative examples, but it should be understood that the invention is not construed as being limited thereto.

EXAMPLE 1

One surface of glassine paper having a basis weight of 50 g/m$^2$ was laminated by extrusion with low-density polyethylene (0.92 g/cm$^3$) having a viscosity average molecular weight of 300,000, which contained 0.4% by weight of an antioxidant, to form a layer to be printed having a thickness of 18 µm. The other surface thereof was uniformly coated with a solution of a acrylic adhesive in toluene by the doctor blade method to form a viscoelastic material layer having a thickness of 30 µm. Then, a solution of a polyester adhesive in toluene was uniformly applied onto it by the doctor blade method to form an adhesive layer having a thickness of 5 µm, thus obtaining an adhesive sheet for printing. The adhesive layer was adhered to the layer to be printed, and the adhesive sheet was wound to obtain a wound product.

The above-mentioned acrylic adhesive was a composition in which 0.02 part (part by weight, hereinafter the same) of an epoxy crosslinking agent was added to 100 parts of a copolymer comprising 100 parts of butyl acrylate and 5 parts of acrylic acid and having a molecular weight of 500,000, and formed the viscoelastic material layer having a complex rigidity of $10^6$ dynes/cm$^2$ at ordinary temperature at a frequency of 1 Hz, measured with a viscoelastic spectrometer. The polyester adhesive was a composition in which 3 parts of a urethane crosslinking agent were added to 100 parts of a polyester.

On the other hand, 100 parts of a carbon powder were added to 100 parts of polyethylene having a viscosity average molecular weight of 8,000, and uniformly mixed therewith at about 200° C. A 4.5 μm-thick polyester film was coated with the resulting uniform dispersion to a thickness of 1.2 μm using a hot-melt gravure coater to obtain an ink sheet. The ink sheet thus obtained was loaded in a commercial heat transfer printer, and the wound product obtained above was mounted therein. Then, the ink was heat transferred to the layer to be printed to print letters, thereby obtaining a label.

EXAMPLE 2

An adhesive sheet for printing and a label were obtained in accordance with Example 1 with the exception that the adhesive layer was formed of an urethane adhesive in place of the polyester adhesive.

EXAMPLE 3

An adhesive sheet for printing and a label were obtained in accordance with Example 1 with the exception that the adhesive layer was formed of a polyamide adhesive in place of the polyester adhesive.

COMPARATIVE EXAMPLE 1

An adhesive sheet for printing was obtained and a label was formed in accordance with Example 1 with the exception that no polyester adhesive layer was formed on the viscoelastic material layer.

COMPARATIVE EXAMPLE 2

An adhesive sheet for printing and a label were obtained in accordance with Example 1 with the exception that the viscoelastic material layer was formed by a polyethylene layer having a complex rigidity of $10^8$ dynes/cm$^2$.

COMPARATIVE EXAMPLE 3

An adhesive sheet for printing was obtained and a label was formed in accordance with Example 1 with the exception that no layer to be printed was provided.

EVALUATION TESTS

With respect to the adhesive sheets for printing or the labels obtained in Examples 1 to 3 and Comparative Examples 1 to 3, the following characteristics were examined.

Adhesive Strength (Rewinding Property):

The wound product of the adhesive sheet for printing formed to a width of 50 mm was rewound at a speed of 5 m/minute, and the force required for releasing at that time was examined.

Printing Property:

The state of printed letters on the label was examined.

Fixing Strength:

A flap of a medium-sized corrugated fiberboard container was sealed with the 50 mm-wide label, and allowed to stand at 50° C. for 2 days. Then, the presence or absence of pop up (natural unsealing) was examined.

Results thereof are shown in the following table.

| | Adhesive strength (g/50 mm) | Printing Property | Pop Up |
|---|---|---|---|
| Example 1 | 18 | Good | Absence |
| Example 2 | 25 | Good | Absence |
| Example 3 | 20 | Good | Absence |
| Comparative Example 1 | 300 | Poor | Absence |
| Comparative Example 2 | 18 | Good | Presence |
| Comparative Example 3 | Impossible to rewind | — | — |

In Comparative Example 1, when the wound product was rewound, speed dependency of back surface adhesive force was large, and smooth rewinding could not be conducted. If smoothly rewinding the wound product is not conducted the adhesive sheet for printing is plastically deformed to develop creases, which causes the occurrence of a faulty label. Further, its high adhesive strength influences a driving system of the printer to develop uneven printed letters in a direction perpendicular to a drawing-out direction of the adhesive sheet for printing in the test of the printing property.

EXAMPLE 4

One surface of woodfree paper having a basis weight of 80 g/m$^2$ was laminated by extrusion with low-density polyethylene (having a density of 0.92 g/cm$^3$ and a viscosity average molecular weight of 300,000), which contained about 3% by weight of a silicone releasing agent, and then, mirror finished to form a releasing layer to be printed having a mean square roughness of 0.07 μm at a surface thereof and a thickness of 18 μm. The other surface of the above-mentioned woodfree paper was coated with an urethane adhesive containing 2% by weight of a photopolymerization initiator by hot-melt coating, followed by crosslinking treatment with ultraviolet rays to form an adhesive layer having a thickness of 30 μm, thus obtaining an adhesive sheet for printing. The adhesive layer was adhered to the layer to be printed, and the adhesive sheet was wound to obtain a wound product.

On the other hand, 100 parts of a carbon powder were added to 100 parts of polyethylene having a viscosity average molecular weight of 8,000, and uniformly mixed therewith at about 200° C. A 4.5 μm-thick polyester film was coated with the resulting uniform dispersion to a thickness of 1.2 μm using a gravure coater which can coat a hot-melt to obtain an ink sheet. The ink sheet thus obtained was loaded in a commercial heat transfer printer, and the wound product obtained above was mounted therein. Then, the ink was heat transferred to the releasing layer to be printed to print letters, thereby obtaining a label.

EXAMPLE 5

Low-density polyethylene having a density of 0.92 g/cm$^3$ and a viscosity average molecular weight of 300,000 was formed into a 35 μm-thick film having a mean square roughness of 0.12 μm at a surface thereof. Corona treatment was performed on one surface thereof, and a 15 μm-thick acrylic adhesive layer was provided thereon. The film was adhered to glassine paper having a basis weight of 104 g/m$^2$ through the adhesive layer to form a releasing layer to be printed. Thereafter, a 40 μm-thick urethane adhesive layer was formed on the other surface of the glassine paper in accordance with Example 1 to obtain an adhesive sheet for printing. Using a wound product thereof, a label was obtained.

The above-mentioned acrylic adhesive layer was formed by uniformly applying a solution of an acrylic adhesive in ethyl acetate by the doctor blade method and drying it, the acrylic adhesive being a composition in which 0.1 part of an epoxy crosslinking agent was added to 100 parts of a copolymer consisting of 100 parts of butyl acrylate and 5 parts of acrylic acid and having a molecular weight of 300,000.

COMPARATIVE EXAMPLE 4

An adhesive sheet for printing was obtained and a label was formed in accordance with Example 1 with the exception that the layer to be printed was pressed with a mat treating roll in lamination by extrusion to give a releasing layer to be printed having a mean square roughness of 0.7 μm at a surface thereof.

COMPARATIVE EXAMPLE 5

An adhesive sheet for printing was obtained and a label was formed in accordance with Example 2 with the exception that high-density polyethylene (having a density of 0.95 g/cm$^3$) was used in place of low-density polyethylene. The mean square roughness of a surface of the releasing layer to be printed (having a thickness of 35 μm) was 0.12 μm, which was the same as in Example 2.

EVALUATION TESTS

With respect to the adhesive sheets for printing or the labels obtained in Examples 4 and 5 and Comparative Examples 4 and 5, the following characteristics were examined.

Rewinding Property:

It was examined whether or not rewinding can smoothly be conducted due to speed dependency of back surface adhesive force of the sheet in rewinding the wound product of the adhesive sheet for printing by means of a heat transfer printer in the label formation. If smooth rewinding is not conducted, the adhesive sheet for printing is plastically deformed to develop creases, which causes the occurrence of a faulty label.

Printing Property:

The state of printed letters on the label, particularly the sharpness thereof, was examined. Trace of releasing means a printing unevenness due to non-smooth rewinding.

Rewinding Adhesive Strength (Heat Resistance):

The wound product of the adhesive sheet for printing formed to a width of 50 mm was allowed to stand at 25° C. or 70° C. for 96 hours, and then, rewound at a speed of 5 m/minute. The force required for releasing at that time was examined.

Results thereof are shown in the following table.

|  | Rewiding Property | Printing Property | Rewinding Adhesive Strength (gf/50 mm) | |
| --- | --- | --- | --- | --- |
|  |  |  | 25° C. | 70° C. |
| Example 4 | Good | Good | 500 | 1000 |
| Example 5 | Good | Good | 600 | 900 |
| Comparative Example 4 | Impossible | Trace of Releasing | 5400 | 7200 |
| Comparative Example 5 | Impossible | Trace of Releasing | 5200 | 6000 |

While the invention has ben described in detail and with reference to specific embodiments thereof, it will be apparent to one skilled in the art that various changes and modifications can be made therein without departing from the spirit and scope thereof.

What is claimed is:

1. An adhesive sheet for printing comprising (i) a layer to be printed in which a surface portion is formed of a polyolefin layer, and (ii) an adhesive layer adhering to said layer to be printed, said adhesive sheet having the following elements:
   (1) a polyolefin polymer constituting the polyolefin layer has a density of 0.94 g/cm$^3$ or less;
   (2) the layer to be printed has no release coat;
   (3) the layer to be printed has a mean square roughness of 0.4 μm or less at a surface thereof;
   (4) an adhesive strength when the adhesive sheet is wound to form a wound product and then unwound at a speed of 5 m/minute is 5,000 gf/50 mm; and
   (5) an adhesive strength when the adhesive sheet is wound to form a wound product and then unwound at a speed of 5 m/minute after standing at 70° C. for 96 hours is 5 to 4,000 gf/50 mm.

2. The adhesive sheet for printing according to claim 1, wherein the layer to be printed contains a releasing polymer.

3. A label having a heat transfer pattern comprising a heat fixing ink comprising a polyolefin and a colorant on the layer to be printed of the adhesive sheet for printing according to claim 2.

4. The adhesive sheet for printing according to any one of claims 1 to 2, wherein the adhesive layer is formed of at least one of a urethane adhesive, a polyester adhesive and a polyamide adhesive.

5. A label having a heat transfer pattern comprising a heat fixing ink comprising a polyolefin and a colorant on the layer to be printed of the adhesive sheet for printing according to claim 4.

6. The adhesive sheet for printing according to claim 1, which has an adhesive strength of 10 gf/50 mm to 1500 gf/50 mm when the adhesive sheet is wound to form a wound product and the unwound at a speed of 5 m/minute after standing at 70° C. for 96 hours.

7. The adhesive sheet for printing according to any one of claims 2, 6 or 1, wherein a reinforcing substrate and a viscoelastic material layer are placed between the layer to be printed and the adhesive layer.

8. A label having a heat transfer pattern comprising a heat fixing ink comprising a polyolefin and a colorant on the layer to be printed of the adhesive sheet for printing according to claim 7.

9. The adhesive sheet for printing according to claim 7, wherein the viscoelastic material layer has a complex rigidity of 10$^4$ to 10$^7$ dynes/cm$^2$ at room temperature at a frequency of 1 Hz.

10. A label having a heat transfer pattern comprising a heat fixing ink comprising a polyolefin and a colorant on the layer to be printed of the adhesive sheet for printing according to claim 9.

11. A label having a heat transfer pattern comprising a heat fixing ink comprising a polyolefin and a colorant on the layer to be printed of the adhesive sheet for printing according to claim 6.

12. A label having a heat transfer pattern comprising a heat fixing ink comprising a polyolefin and a colorant on the layer to be printed of the adhesive sheet for printing according to any one of claims 1.

* * * * *